United States Patent Office 3,418,360
Patented Dec. 24, 1968

3,418,360
ESTERIFICATION IN THE PRESENCE OF ALKANOIC ACID AMIDES
Johann Gustav David Schulz, Arthur C. Whitaker and Paolo Winteler, Pittsburgh, Pa., assignors to Gulf Research & Development Company, Pittsburgh, Pa., a corporation of Delaware
No Drawing. Filed Dec. 14, 1964, Ser. No. 418,270
4 Claims. (Cl. 260—475)

ABSTRACT OF THE DISCLOSURE

An organic ester is produced by reacting the salt of a carboxylic acid with a saturated alkyl halide having between one and 40 carbon atoms at a temperature between 110° and 160° C. in the presence of a liquid highly polar solvent free of hydroxyl groups. The preferred solvents are dimethylformamide and dimethylsulfoxide. A colorless ester is produced when dimethylformamide is employed as the solvent by the exclusion of molecular oxygen and actinic light from the reaction.

---

This invention relates to an improvement in the preparation of organic esters by the reaction of carboxylic acid salts with organic halides in the presence of novel solvents.

The reaction of carboxylic acid salts, such as alkali metal salts of carboxylic acids with organic halides, such as alkyl bromides to produce organic esters is well known in the art. The processes of the prior art suffer from certain disadvantages, such as low conversions and/or the production of unwanted by-products. For example, the use of water as a solvent suffers from the disadvantage that the water partially hydrolyzes the organic halides to form unwanted alcohols. In addition, since hydrolysis proceeds more rapidly with the lower carbon number alkyl halides, the use of water as a solvent limits the alkyl halides to those having higher carbon numbers, such as eight or more. The use of certain organic solvents, such as ethanol and methanol, are also known but are generally unsuitable since the alcohols will react with the organic halides to produce unwanted ethers. The use of other organic solvents, such as ethers, is generally undesirable in that the reaction proceeds to a very low degree, i.e., the conversions are low. It has been found that certain solvents to be defined below promote the desired reaction while resulting in the production of very little, if any, by-products.

In accordance with the invention, organic esters are produced in improved yields and efficiencies by a process which comprises reacting a salt of a carboxylic acid with an organic halide in the presence of a liquid aprotic organic solvent having a dielectric constant at 25° C. of at least 20, wherein the weight ratio of solvent to reactants is at least 0.5:1.

The reaction of salts of carboxylic acids with organic halides is well known. The salt of a carboxylic acid can suitably be any salt of a carboxylic acid, the cationic portion of which will react with the halide portion of an organic halide to form a halide salt. It is preferred that the cationic portion of the carboxylic acid salt be selected from the group consisting of monovalent alkali metals and the ammonium ion [NH$_4$+]. The monovalent alkali metals include sodium, potassium and lithium. The sodium salts are the most preferred salts.

Any carboxylic acid can be employed in the preparation of the reactant acid salts to be used in the process of this invention. The carboxylic acid can be mono or polycarboxylic, that is, the acid can contain between 1 and 8 carboxyl groups, and preferably contains between 1 and 4 carboxyl groups. By "carboxylic acid" is also meant the carboxylic acid anhydrides, such as for example, propionic anhydride, phthalic anhydride and 3,4,3′,4′-benzophenonetetracarboxylic acid dianhydride. The carboxylic acid may be alkyl, cycloalkyl, aryl, alkaryl, aralkyl or heterocyclic in addition to being saturated or unsaturated. The acids can suitably have between 1 and 40 carbon atoms, and preferably have between 1 and 20 carbon atoms.

The mononuclear aromatic dicarboxylic acids are particularly preferred, such as phthalic acid and phthalic anhydride.

Examples of suitable organic acids include, but are not limited to, formic, acetic, propionic, butyric, valeric, caproic, caprylic, capric, lauric, myristic, chloroacetic, stearic, lignoceric, cerotic, oleic, ricinoleic, arachidonic, erucic, benzoic, adipic, acrylic, succinic, toluic, pyromellitic, terephthalic, dicarboxydiphenylmethane, acetic anhydride, stearic anhydride, and succinic anhydride.

It is the salts of carboxylic acids, such as those given above, which are used in the process of this invention. The cationic portion of the salt may, of course, vary as noted above. The acid salts may be prepared by any suitable procedure, such as by treating the desired acid at suitable temperatures and pressures with an appropriate quantity of a monovalent alkali metal base, such as NaOH or with NH$_4$OH.

Examples of salts of carboxylic acids which can be used in the process of this invention include, but are not limited to, sodium formate, potassium acetate, ammonium butyrate, sodium benzoate, disodium phthalate, sodium caproate, sodium stearate, and potassium acrylate.

An organic halide can suitably be employed in this reaction. The preferred alkyl halides have the general formula:

$$RX$$

where R can be any organic radical, saturated or unsaturated, substituted or unsubstituted; and X represents a halide selected from the group consisting of iodine, bromine and chlorine. For example, R in the above formula can be any alkyl, cycloalkyl, aryl, alkaryl or aralkyl group. The most preferred organic halides are the saturated alkyl halides. A substituent, such as halogen, nitro and ester groups are allowable so long as they do not interfere with the desired reaction. The organic halides can have between 1 and 40 carbon atoms, or more, and preferably have between 5 and 15 carbon atoms. The preferred halogens are bromine and iodine.

A list of suitable organic halides includes: monochloro-methane, mono-bromo-methane, mono-bromo-ethane, 1-iodo-propane, isopropyl bromide, 1,3-diiodo-pentane, 1-bromo-octane, 1-iodo-decane, 2-chloro-tetradecane, 1-bromo-eicosane, benzyl chloride, p-nitro-bromobenzene, 1-iodo-naphthalene, 2-bromo-anthracene, allyl bromide; and 1,4-dibromooctane.

As noted above, the acid salt can be the salt of a mono or polycarboxylic acid and the organic halide can be a monohalogen containing organic halide or a polyhalogen containing organic halide. When both of the reactants are monofunctional, that is, when the salt of the carboxylic acid is prepared from a monocarboxylic acid and when the organic halide has only one halogen atom, the resulting ester is a monomeric ester having only one ester group. For example, the reaction of n-butyl bromide with sodium acetate produces n-butyl acetate. When one of the reactants is monofunctional, and one of the reactants is polyfunctional, that is, contains more than one carboxylate group in the acid salt or more than one halogen in the organic halide, then the resulting ester is a monomeric ester having as many ester groups as the number of functional groups in the polyfunctional reactant. For example, when n-octyl bromide is reacted with disodium-phthalate, the ester dioctylphthalate is produced. When both of the reactants are polyfunctional, then the resulting ester will be a polyester. For example, when dibromooctane is reacted with disodiumphthalate, a polyester results.

In most instances, the salts of the carboxylic acids are solids. In order to obtain excellent yields of the ester by the above reaction, it is important that some means be employed to effectuate contact between the solid salt of the carboxylic acid and the liquid halide other than solid liquid contact. It has been found that a solvent, such as water, which will dissolve the carboxylic acid salt has little to no ability to dissolve the organic halide. In a similar manner, solvents such as acetone, hexane, etc. which readily dissolve the organic halide, are unsuitable for dissolving the carboxylic acid salts. Water, as noted above, is also undesirable in that it hydrolyzes the organic halides by known reactions. Alcohols or other materials containing a hydrogen directly connected to an oxygen are also unsuitable since they tend to form ethers in the presence of organic halides.

The solvent for this reaction can be any organic compound or mixture of organic compounds which is liquid under the conditions of the reaction, which is aprotic and which has a dielectric constant at 25° C. of at least 20. By an aprotic solvent is meant one which does not have a hydrogen atom directly connected to an oxygen atom. There is therefore an absence of hydroxyl groups in an aprotic solvent. That is, an aprotic solvent is free of hydroxyl groups. The solvent must be aprotic to insure that it will not react with the organic halides to form undesirable ethers. The acid salt and organic halide should also, of course, be aprotic. The preferred liquid organic solvents are those which have a dielectric constant at 25° C. between 20 and 60, and the more preferred solvents are those having a dielectric constant at 25° C. between 30 and 50. Solvents meeting the criteria above have been found to be miscible in all proportions with the organic halide and in addition at least partially dissolve the carboxylic acid salt. By partially dissolve is meant that at least one weight percent of the carboxylic acid salt is soluble in the solvent. The dissolved salts being in intimate contact form the desired ester and a by-product inorganic salt. As the reaction proceeds, more of the carboxylic acid salt dissolves to form additional ester. Thus, high conversions with excellent efficiencies to the desired ester are obtained using the solvents of this invention.

Examples of suitable solvents include the substituted acid amides and the organic sulfoxides.

The substituted acid amides can be represented by the general formula:

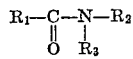

where $R_1$ is selected from the group consisting of hydrogen and a hydrocarbon radical having between 1 and 8 carbon atoms; $R_2$ and $R_3$ are selected from the group consisting of hydrogen and an alkyl radical having between 1 and 3 carbon atoms, and wherein the acid amide contains at least two carbon atoms. Examples of preferred acid amides include N-methylformamide, N,N-dimethylformamide, N,N-dimethylacetamide and N,N-dimethylpropionamide.

It has been found that when a solvent comprising a substituted acid amide is employed, the reaction should be run in the absence of actinic light and free molecular oxygen if a colorless product is desired. One method is to run the reaction blanketed with nitrogen and in an opaque reaction vessel.

The organic sulfoxides can be represented by the general formula:

where $R_4$ and $R_5$ can be the same or different and are hydrocarbon radicals having between 1 and 8 carbon atoms. Examples of suitable sulfoxides include dimethylsulfoxide, diethylsulfoxide, ethylpropylsulfoxide, dioctylsulfoxide, benzylmethylsulfoxide, diphenylsulfoxide, paramethylphenylethylsulfoxide, and dichloromethylsulfoxide. Dimethylsulfoxide is the preferred sulfoxide.

It has been found that a small amount of a complex forms between a portion of the organic halide and the organic sulfoxide. The complex is easily broken by the addition of a dilute solution of a base, such as NOH, to regenerate the organic halide and organic sulfoxide. Thus, none of the organic halide is lost, but can be recycled for further reaction. In addition, since the complex is an equilibrium complex, an equilibrium amount can suitably be maintained in the organic sulfoxide solvent.

The most preferred solvent is dimethylformamide which has a dielectric constant at 25° C. of 37. Dimethylsulfoxide and dimethylacetamide, which are also preferred solvents, have dielectric constants at 25° C. of 45 and 37.8 respectively.

The suitability of any particular organic compound or mixture of organic compounds for use as a solvent in the subject reaction can easily be determined by one skilled in the art by obtaining the dielectric constant of the organic compound or mixture of compounds at 25° C. and determining by any suitable procedure, for example by infrared analysis, whether the organic compound or mixture of organic compounds contains a hydrogen atom directly connected to an oxygen atom. If the dielectric constant is less than about 20 at 25° C. the organic compound is unsuitable. In like manner, if the compound contains a hydrogen atom directly connected to an oxygen atom, it is unsuitable for use as a solvent in the process of this invention for the reasons given above.

The reaction conditions should be such that the reactants are maintained substantially completely in the liquid phase. The reaction temperature can suitably be between about room temperature and 250° C. and is preferably between 60° and 200° C. In general, the higher reaction temperatures are preferred with the high carbon number charge stocks. The reaction pressure should be sufficient to keep the solvent and the reactants in the liquid phase and is suitably between atmospheric and about 1,000 p.s.i.g. or higher.

The reaction time should be sufficient for the desired reaction to occur. In general, the more soluble the reactant and the higher the reaction temperature, the lower is the over-all reaction time. Reaction times between 10 minutes and 12 hours are generally satisfactory.

The reaction of the salt of the carboxylic acid with the organic halide to produce the desired organic ester requires stoichiometric amounts of both reactants, based on the number of functional groups in the reactants. By a functional group is meant a halogen atom in the organic halide and carboxylate group in the salt of the carboxylic acid. In the production of monomeric esters, the ratio of carboxylate groups in the carboxylic acid salt to the halogen atoms in the organic halide is preferably about 1:1, however, ratios of between about 10:1 and 1:10 can be employed. For example, in the case of the reaction of organic monohalides with the salt of a monocarboxylic acid the ratio of the functional groups is the same as the molar ratio of the reactants.

The amount of solvent to employ is important if excellent conversions and efficiencies to the formation of the ester are to be obtained. The weight ratio of solvent to the carboxylic acid salt and organic halide reactants must be at least about 0.5:1 and can be as high as 100:1. The preferred weight ratio of solvent to reactants is between 1:1 and 10:1. When too little solvent is employed, that is, when the weight ratio of solvents to reactants is less than about 0.5:1, poor conversions and efficiencies are obtained. Weight ratios above about 100:1 provide no additional benefits.

As noted above, besides the desired organic ester, an inorganic salt, i.e., a metal halide or ammonium halide, is obtained as a by-product. The reaction mixture can be separated by any suitable procedure to isolate the desired organic ester. One suitable procedure is to treat the reaction mixture with a sufficient quantity of water to form an organic and an aqueous phase. The ester is generally insoluble in the aqueous phase while the solvent being highly polar and the metal or ammonium halide are water soluble and go into the aqueous phase. By this method, the desired ester can readily be separated from the reaction solvent and the by-product organic halide.

It has been found that with the solvents of this invention the reaction can be run at lower temperatures than heretofore possible while still maintaining the high conversions and efficiencies. Thus, as noted above, temperatures between room temperature and about 250° C. can be employed with preferred temperatures between about 60° and 200° C. The most preferred tempertures are, however, between about 110° and 160° C., where nearly quantitative conversions and efficiencies were obtained using dimethylformamide as the solvent.

The invention will be further described with reference to the specific examples to be given below.

Example 1

Into a two-liter three-necked round bottomed flask was added 105 grams (0.5 mol.) of disodiumphthalate and 700 grams of dimethylformamide (DMF). This mixture was heated to 150° C., and 193 grams (1 mol.) of n-octylbromide were slowly added to this mixture. The weight ratio of DMF to total reactants was 2.35:1. The reaction was run at atmospheric pressure under a nitrogen atmosphere in the absence of actinic light with continuous stirring. After two hours the reaction mixture was diluted with an excess of water sufficient to result in the separation of a colorless organic layer. Analysis of the products showed that the conversion of the alkyl bromide was in excess of 99 percent and the efficiency to the production of dioctylphthalate was 98 percent.

Example 2

Example 1 was repeated except 27.5 mols (2,010.0 grams) of DFM were used but no effort was made to exclude light or initially purge the air from the reaction vessel with nitrogen. The weight ratio of DMF to total reactants was greater than 6:1. When the reaction was completed, most of the solvent (DMF) was flash evaporated and the reaction mixture was treated with 300 ccs. of acetone to dissolve everything but the sodium bromide. After separation of the sodium bromide the DMF and acetone were evaporated. The conversion and efficiency were about the same as in Example 1, that is, substantially quantitative, but the product ester had a brownish color.

A comparison of Examples 1 and 2 shows the excellent (substantially quantitative) conversions and efficiencies obtainable by esterifying in the presence of the solvents of this invention. These examples also show the importance of excluding actinic light and molecular oxygen if a colorless ester product is desired.

Example 3

442.16 grams (2 mols) of n-decylbromide were added slowly to a slurry of 210 grams (1 mol) of disodiumphthalate and 2200 grams of DMF under a nitrogen atmosphere at atmospheric pressure while stirring at 135° to 150° C. The weight ratio of DMF to total reactants was greater than 3:1. Light was excluded. After two hours the reaction was stopped and the reaction mixture was diluted with an excess of water sufficient to result in the separation of a colorless organic layer. Analysis of the reaction product showed that the conversion of the n-decylbromide was in excess of 99 weight percent and the efficiency of conversion to di-n-decylphthalate was 98.2 percent.

Example 4

Example 3 was repeated except only 21 grams (0.1 mol) of disodiumphthalate, 48.6 grams (a little over 0.2 mol) of n-decylbromide, and 17.4 grams of DMF were employed. The weight ratio of DMF to total reactants was only 0.25:1. Light was not excluded. A colored organic layer was obtained as one of the products. Analysis showed a conversion of the alkyl bromide of only 79 weight percent with an efficiency of conversion to the ester of only 91 percent.

Example 5

Example 4 was repeated except 34.8 grams of DMF were employed. The weight ratio of DMF to total reactants was 0.5:1. Analysis of the product showed a conversion of the alkyl bromide of 92 weight percent with an efficiency to the desired ester in excess of 95 weight percent.

A comparison of Examples 1, 3, 4 and 5 shows the importance of employing a weight ratio of DMF to total reactants of at least 0.5:1. When a ratio of 0.25:1 was employed (Example 4) the yield of ester was only 72 percent [conversion×efficiency], but when a weight ratio of 0.5:1 (Example 5) was employed, the conversion unexpectedly increased to 92 weight percent and the efficiency of conversion to the ester increased to over 95 percent. When a weight ratio of DMF to total reactants of 2:1 (Example 1) and 3:1 (Example 3) was employed, substantially quantitative yields were obtained.

Example 6

Example 2 was repeated except the reaction temperature was 170° C., the reaction pressure 500 p.s.i.g. and the DMF solvent was replaced with a mixture of water and acetone, the water consisting of 30 weight percent of the mixture. The conversion of n-octylbromide was only 87 percent with an efficiency of conversion to di-n-octylphthalate of only 92 percent.

A comparison of Examples 4, 5 and 6 shows again the importance of employing a sufficient weight ratio of solvent to reactants. At a weight ratio of 0.25:1 (Example 4), the conversion and efficiency were poorer than when a mixture of water and acetone was used as the solvent as shown in Example 6. The use of a weight ratio of solvent to reactants of 0.5:1 (Example 5), however, shows better results than the use of water and acetone (Example 6). Therefore, in order to obtain the improved conversions and efficiencies of the process of this invention, a weight ratio of solvent to total reactants of at least about 0.5:1 must be employed.

Example 7

In this example 44.2 grams of n-decylbromide (0.2 mol) were added slowly to a slurry of 650 grams of dimethylsulfoxide (DMSO) and 21 grams (0.1 mol) of disodiumphthalate at atmospheric pressure and a temperature between 135° and 140° C. The weight ratio of DMSO to total reactants was 10:1. The reaction time was three hours. Analysis of the product shows the conversion of n-decylbromide was 96 weight percent and the efficiency of conversion to didecylphthalate was 91 percent.

The only other detectable product was a complex of n-decylbromide and dimethylsulfoxide. This complex was recovered and treated with a 10 percent excess of the stoichiometric amount of a 5 percent sodium hydroxide solution. This treatment resulted in the breakdown of the complex, and n-decylbromide was recovered.

Since the n-decylbromide can be recovered and recycled, and since no other by-products were present in sufficient amounts to be detected, the efficiency of conversion to useful products in Example 6 was over 99 percent. It is believed that the formation of the complex is an equilibrium type reaction and therefore if the complex was formed initially and added to the dimethylsulfoxide, or merely recycled after being formed in an initial run, then the efficiency of conversion of the organic halide would be over 99 percent.

A comparison of Examples 1, 2, 3, and 6 with Example 4 shows the advantage of using the novel solvents of this invention compared to use of other solvents, such as a water-acetone mixture. The use of the solvents of this reaction in the proper amounts results in substantially complete conversions with excellent efficiency. In addition, the excellent results are obtained with the use of lower temperatures than are employed with other solvents, such as water-acetone as noted by comparing the above examples.

Resort may be had to those variations and modifications as fall within the spirit of the invention and the scope of the appended claims.

We claim:
1. A process for the production of a colorless organic ester which comprises reacting the salt of a carboxylic acid having between one and four carboxyl groups and between one and 20 carbon atoms with an alkyl halide having between 1 and 20 carbon atoms in the presence of a liquid aprotic organic solvent having the general formula:

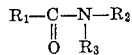

where $R_1$, $R_2$ and $R_3$ are selected from the group consisting of hydrogen and a lower alkyl radical; and wherein the acid amide contains at least 2 carbon atoms; and wherein the reaction is run in the absence of actinic light and molecular oxygen.

2. A process according to claim 1 wherein the alkyl halide is a saturated alkyl halide.

3. A process according to claim 2 wherein the reaction temperature is between about 110° and 160° C.

4. A process according to claim 1 wherein the reaction mixture is added to a sufficient quantity of water to form an organic phase containing the desired ester and an aqueous phase containing the highly polar solvent and the inorganic halide by-product, and thereafter recovering the desired colorless ester.

References Cited
UNITED STATES PATENTS 3,069,459    12/1969    Tsou et al. _____ 260—475

OTHER REFERENCES

Kharasch, "Organic Sulfur Compounds," vol. I, Pergamon Press, N.Y., 1961, pp. 176–177. QD412/S1Q7.

Gilman, Organic Chemistry, vol. I (2nd ed.), John Wiley and Sons, New York, N.Y., 1943, pp. 1053 and 1054. QD251/G55.

LORRAINE A. WEINBERGER, *Primary Examiner.*

T. L. GALLOWAY, *Assistant Examiner.*

U.S. Cl. X.R.

260—410, 410.9, 476, 485, 486, 487, 493